(12) United States Patent
Moulton (10) Patent No.: US 11,306,821 B2
(45) Date of Patent: Apr. 19, 2022

(54) GASKET ASSEMBLY

(71) Applicant: Wesley G. Moulton, Oklahoma City, OK (US)

(72) Inventor: Wesley G. Moulton, Oklahoma City, OK (US)

(*) Notice: Subject to any disclaimer, the term of this patent is extended or adjusted under 35 U.S.C. 154(b) by 314 days.

(21) Appl. No.: 16/512,362

(22) Filed: Jul. 15, 2019

(65) Prior Publication Data

US 2020/0018396 A1  Jan. 16, 2020

Related U.S. Application Data

(60) Provisional application No. 62/736,536, filed on Sep. 26, 2018, provisional application No. 62/698,664, filed on Jul. 16, 2018.

(51) Int. Cl.
  *F16J 15/02*  (2006.01)
  *F16J 15/10*  (2006.01)
  *F25D 23/08*  (2006.01)

(52) U.S. Cl.
  CPC ........... *F16J 15/104* (2013.01); *F16J 15/027* (2013.01); *F25D 23/087* (2013.01)

(58) Field of Classification Search
  CPC ....... F16J 15/104; F16J 15/027; F25D 23/087
  See application file for complete search history.

(56) References Cited

U.S. PATENT DOCUMENTS

| | | | |
|---|---|---|---|
| 1,986,465 A | 1/1935 | Dempsey | |
| 2,701,395 A | 2/1955 | Barroero | |
| 2,722,043 A | 11/1955 | Nenzell | |
| 2,794,221 A | 6/1957 | Bedics | |
| 2,899,720 A | 8/1959 | Vollmer | |
| 3,226,367 A | 12/1965 | Angelo | |
| 3,231,289 A | 1/1966 | Carrell | |
| 3,378,957 A | 4/1968 | Frehse | |
| 4,067,794 A * | 1/1978 | Ganzi | B01D 61/50 204/627 |
| 4,293,135 A | 10/1981 | Wallace | |
| 4,572,522 A | 2/1986 | Smagatz | |
| 4,997,155 A * | 3/1991 | Reuter | F16M 11/2014 248/278.1 |
| 5,236,203 A | 8/1993 | Uchida et al. | |
| 5,618,047 A | 4/1997 | Belter | |
| 5,695,263 A * | 12/1997 | Simon | H05K 7/183 312/265.4 |
| 6,945,540 B2 | 9/2005 | Bormann et al. | |

(Continued)

FOREIGN PATENT DOCUMENTS

GB        1460169 A    12/1976
WO    2005052416 A1    6/2005

OTHER PUBLICATIONS

ISA/US; International Search Report and Written Opinion; PCT/US2019/041900; dated Oct. 3, 2019.

*Primary Examiner* — Vishal A Patel
(74) *Attorney, Agent, or Firm* — Crowe & Dunlevy, P.C.

(57) ABSTRACT

A refrigerator gasket assembly has a first gasket section, a second gasket section and a coupler connecting the first gasket section and the second gasket section. The coupler is configured to permit the selective connection and disconnection of the first gasket section from the second gasket section. In some variations, the coupler is a two piece coupler and in other variations the coupler is a three piece coupler.

5 Claims, 10 Drawing Sheets

(56) References Cited

U.S. PATENT DOCUMENTS

| | | | |
|---|---|---|---|
| 8,240,940 B2* | 8/2012 | Strohheker | E06B 3/667 |
| | | | 403/205 |
| 9,383,016 B2* | 7/2016 | Schaaf | H02B 1/28 |
| 9,841,223 B2 | 12/2017 | Gu | |
| 2004/0139661 A1 | 7/2004 | Cittadini | |
| 2011/0031704 A1 | 2/2011 | Lehr et al. | |
| 2011/0272895 A1 | 11/2011 | Kritzer et al. | |
| 2012/0007321 A1 | 1/2012 | Davis et al. | |
| 2014/0144090 A1* | 5/2014 | Rebman | E06B 3/263 |
| | | | 52/203 |
| 2014/0367923 A1* | 12/2014 | Schaaf | H05K 9/0015 |
| | | | 277/637 |

* cited by examiner

GASKET ASSEMBLY

RELATED APPLICATIONS

The present application claims the benefit of U.S. Provisional Patent Application Ser. No. 62/736,536 filed Sep. 26, 2018 entitled "Gasket Assembly," and U.S. Provisional Patent Application Ser. No. 62/698,664 filed Jul. 16, 2018, also entitled "Gasket Assembly," the disclosures of which are fully incorporated herein as if set forth in their entireties within the present application.

FIELD OF THE INVENTION

The present application is generally directed at refrigeration gaskets and more particularly to a modular gasket system that is well suited for use in connection with residential and commercial refrigerators.

BACKGROUND

Many residential and commercial refrigerators employ gaskets between the main body of the refrigerator and the doors that provide access to the interior of the refrigerator. The gaskets seal gaps between the door and the main body to reduce heat exchange through the closed doors of the refrigerator. The gasket also absorbs the impact from the door closing and minimizes the movement of air through the closed doors.

Refrigerator doors are generally rectangular in shape and the corresponding gaskets follow the same rectangular shape, with an upper horizontal section, two side vertical sections, and a lower horizontal section. While gaskets come in multiple sizes and profiles, they are typically manufactured from a resilient material through extrusion molding. The extrusion is cut to the desired length to form the respective sections, and magnets, which function to keep the door closed, are positioned in the gasket sections. The ends of the gasket sections are then spliced together by heat welding the sections to one another to form the final gasket. The gasket can then be coupled to the rear side of the door.

Figure 1A:
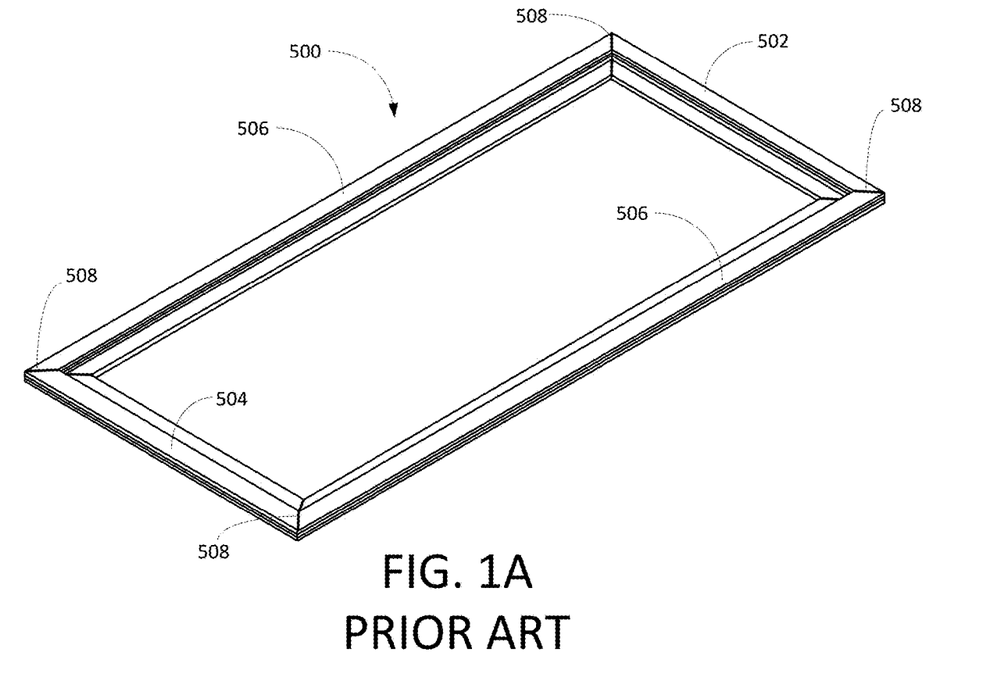
FIG. 1A is a perspective view of a PRIOR ART gasket assembly.
Figure 1B:
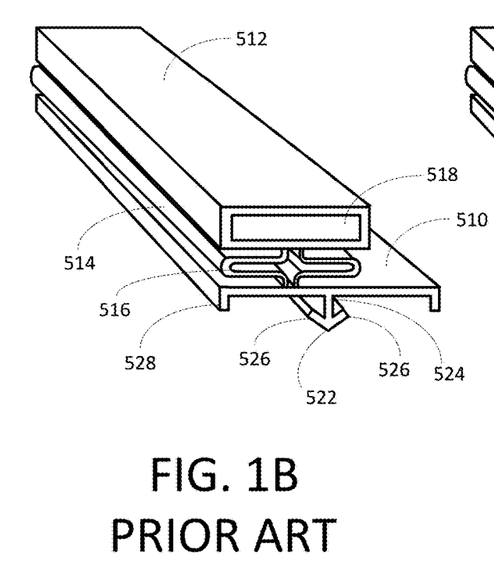
FIG. 1B is a perspective, sectional view of a prior art section of the PRIOR ART gasket assembly of FIG. 1.
Figure 1C:
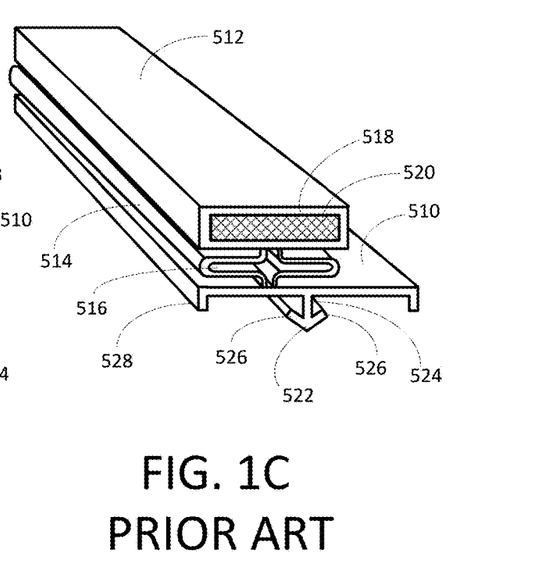
FIG. 1C is a perspective, sectional view of the prior art section of the PRIOR ART gasket assembly of FIG. 2A illustrated with a magnet.

Referring to FIGS. 1A, 1B and 1C, shown therein is a PRIOR ART gasket assembly 500 for a refrigerator door. The gasket assembly 500 includes a top section 502, a bottom section 504, and two side sections 506. The top section 502, the bottom section 504, and the two side sections 506 are generally formed by extruding an elastomeric, resilient material, such as rubber, polyvinyl chloride or the like. The extrusion is cut to the desired length to form the top section 502, the bottom section 504, and the side sections 506. The ends of each section are mitered and spliced together by heat welding at joints 508 to form a rectangular configuration that corresponds to the outer edges of the rear side of a refrigerator door.

FIGS. 1B and 1C show a portion of the top section 502. The top section 502 of the gasket assembly 500 includes a base portion 510 and a cabinet engaging portion 512, with a bellows portion 514 interconnecting the base portion 510 and the cabinet engaging portion 512. The bellows portion 514 is flexible and defines a bellows cavity 516. The cabinet engaging portion 512 has a cavity 518 for holding a strip of magnetic material 520 (FIG. 1B), which when the door is closed will be attracted to magnetic material in the face portion of the cabinet to maintain the refrigerator door in a closed position. The base portion 510 has a downwardly projecting winged dart 522 having a body 524 and diverging arms 526. The body 524 and the diverging arms 526 are received and captured in a gasket retaining channel (not shown) of the refrigerator door. The base portion 510 may have a pair of flanges 528 that seal against the refrigerator door when the dart 522 is positioned in the channel.

Although widely accepted, the PRIOR ART gasket assembly 500 suffers from several drawbacks. Assembling the spliced joints 508 is time consuming and labor intensive. Also, when only a portion of the gasket becomes worn, the entire gasket must be replaced because it is fabricated, shipped and sold as a single unit. Because the PRIOR ART gasket assembly 500 is manufactured prior to shipping, the gasket assembly 500 must be shipped in a large container to avoid warping the sections. There is, therefore, a need for an improved gasket assembly that overcomes these and other deficiencies in the prior art. It is to such an improved gasket assembly that the inventive concepts disclosed herein are directed.

SUMMARY OF THE INVENTION

The inventive concepts disclosed are generally directed to a gasket assembly comprising a plurality of gasket sections detachably connected to one another with a corresponding gasket coupler. In one embodiment, a gasket assembly is disclosed for use in sealing a door to a cabinet of a refrigerator, where the door includes a gasket retaining channel. The gasket assembly has a first gasket section, a second gasket section and a coupler connecting the first gasket section and the second gasket section. The coupler is configured to permit the selective disconnection of the first gasket section from the second gasket section. In some variations, the coupler is a two piece coupler and in other variations the coupler is a three piece coupler.

In another embodiment, the present invention includes a gasket assembly for use in sealing a door to a cabinet of a refrigerator, where the door includes a gasket retaining channel. In this embodiment, the gasket assembly has a first gasket section, a second gasket section and a two piece coupler connecting the first gasket section and the second gasket section. The two piece coupler is configured to permit the selective disconnection of the first gasket section from the second gasket section. The two piece coupler includes an upper part connected to the first gasket section, and a lower part connected to the second gasket section. The lower part has a winged dart that that is configured to be captured within the gasket retaining channel on the door of the refrigerator.

In yet another aspect, the embodiments of the present invention include a gasket assembly for use in sealing a door to a cabinet of a refrigerator, where the door includes a gasket retaining channel, and the gasket assembly has a first gasket section, a second gasket section, and a three piece coupler connecting the first gasket section and the second gasket section at an angle of approximately 90 degrees. The three piece coupler is configured to permit the selective disconnection of the first gasket section from the second gasket section. The three piece coupler includes a first end section connected to the first gasket section, a second end section connected to the second gasket section, and a corner section connected to the first end section and the second end section.

BRIEF DESCRIPTION OF THE DRAWINGS

Like reference numerals in the figures represent and refer to the same or similar element or function. Implementations of the inventive concepts disclosed may be better understood when consideration is given to this detailed description thereof. Such description references to the annexed pictorial illustrations, schematics, graphs, drawings, and appendices. In the drawings.

WRITTEN DESCRIPTION

Before explaining at least one embodiment of the inventive concepts disclosed, it is to be understood that the inventive concepts are not limited in their application to the details of construction and the arrangement of the components or steps or methodologies in the following description or illustrated in the drawings. The inventive concepts disclosed are capable of other embodiments or of being practiced or carried out in various ways. Also, it is to be understood that the phraseology and terminology employed is for description only and should not be regarded as limiting the inventive concepts disclosed and claimed herein.

In this detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features may not be described to avoid unnecessarily complicating the disclosure.

Further, unless stated to the contrary, "or" refers to an inclusive "or" and not to an exclusive "or." For example, a condition A or B is satisfied by anyone of: A is true (or present) and B is false (or not present), A is false (or not present) and B is true (or present), and both A and B are true (or present). In addition, use of the "a" or "an" are employed to describe elements and components of the embodiments herein. This is done merely for convenience and to give a general sense of the inventive concepts disclosed. This description should be read to include one or at least one and the singular also includes the plural unless it is obvious that it is meant otherwise. As used herein any reference to "one embodiment" or "an embodiment" means that a particular element, feature, structure, or characteristic described in the embodiment is included in at least one embodiment. The appearances of the phrase "in one embodiment" in various places in the specification are not necessarily all referring to the same embodiment.

Figure 2A:
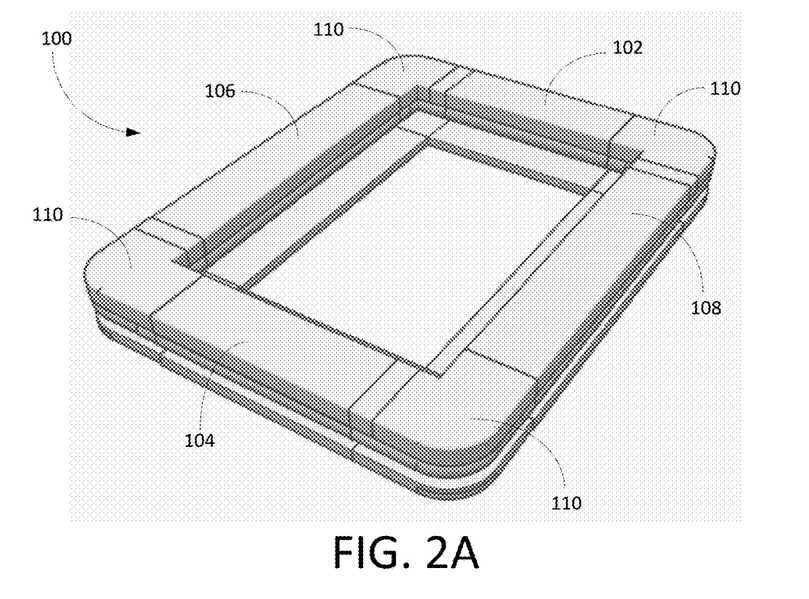
FIG. 2A is a perspective view of a gasket assembly constructed in accordance with a first embodiment (not drawn to scale).
Figure 2B:
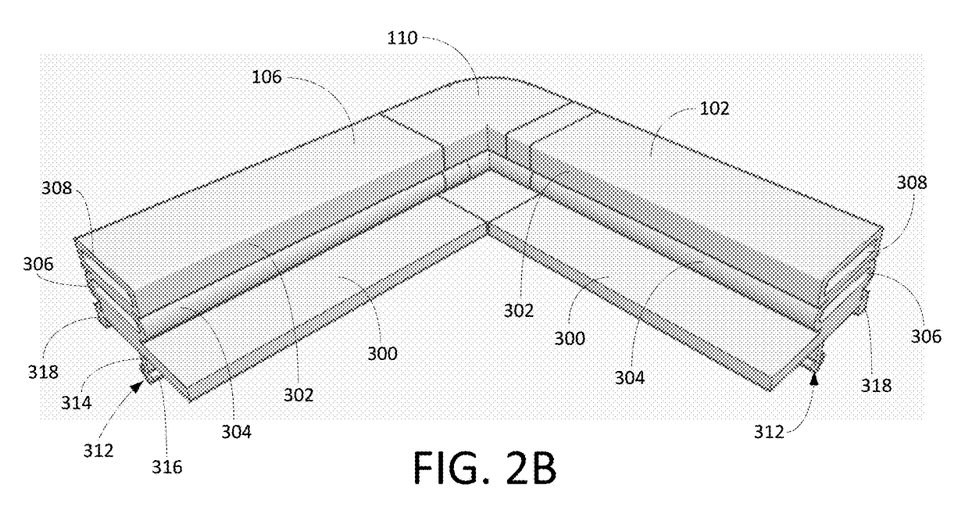
FIG. 2B is a close-up perspective view of a gasket connector assembly and adjacent gasket sections from the gasket assembly of FIG. 2A.

Referring to FIG. 2A, shown therein is a gasket assembly 100 constructed in accordance with a first embodiment. The gasket assembly 100 includes a top section 102, a bottom section 104, a first side section 106 and a second side section 108. Each of the top section 102, bottom section 104, and side sections 106, 108 are joined together by corresponding two-piece couplers 110. The two-piece couplers 110 generally serve as corner pieces that orient and connect the various straight sections of the gasket assembly 100. In some embodiments, the two-piece couplers 110 are configured to connect the various straight sections of the gasket assembly 100 at approximately right angles.

The top section 102, the bottom section 104, and the side sections 106, 108 are similar to the prior art top section 502, the bottom section 504, and the side sections 506, 508 described above except the ends of the top section 102, the bottom section 104, and the side sections 106, 108 are not mitered. Each of the gasket sections 102, 104, 106 and 108 include a base portion 300, a cabinet engaging portion 302, a bellows portion 304, a bellows cavity 306, an upper cavity 308, one or more magnets 310 (not shown), a winged dart 312 (with a body 314 and diverging arms 316), and flanges 318. However, unlike the conventional sections disclosed in connection with the prior art gasket assembly 500, the ends of sections 102, 104, 106 and 108 are cut perpendicular to the longitudinal axis of the sections so the ends are substantially squared off. The two-piece couplers 110 detachably connect one section of the gasket assembly 100 to an adjacent section of the gasket assembly 100 so one section can be removed and replaced while the adjacent sections remain in place. It should be appreciated that the sections 102-108 may be formed to have many profiles and that the two-piece couplers 110 can be fabricated to match those profiles.

Figure 3A:
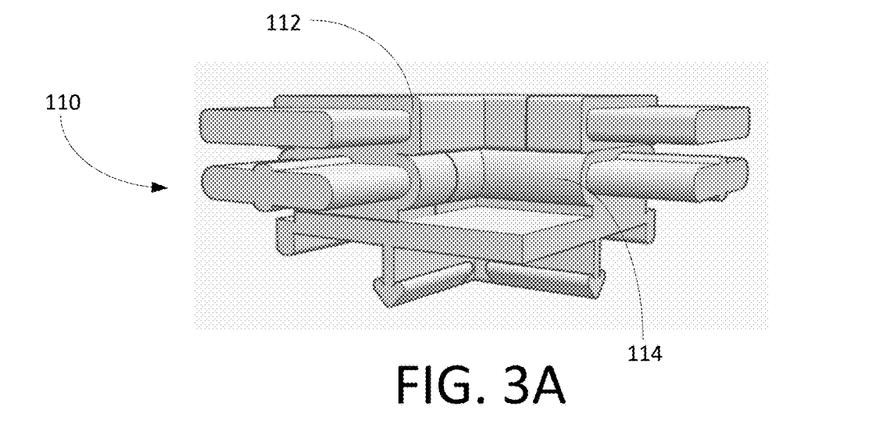
FIG. 3A is an interior perspective view of the gasket connector assembly of FIG. 2B.

Referring to FIGS. 3A-6B, shown therein are various depictions of the two-piece coupler 110. The two-piece coupler 110 comprises an upper part 112 and a lower part 114 that cooperate to form a lap joint. The upper part 112 is adapted to be connected to one end of a section, such as top section 102, and the lower part 114 is adapted to be connected to one end of an adjacent section, such as side section 106. The upper part 112 is adapted to be releasably connected to the lower part 114. As best seen in FIGS. 3A and 3B, the upper part 112 and lower part 114 cooperate to produce a flush-matched coupler when the two parts are detachably joined together.

Figure 5A:
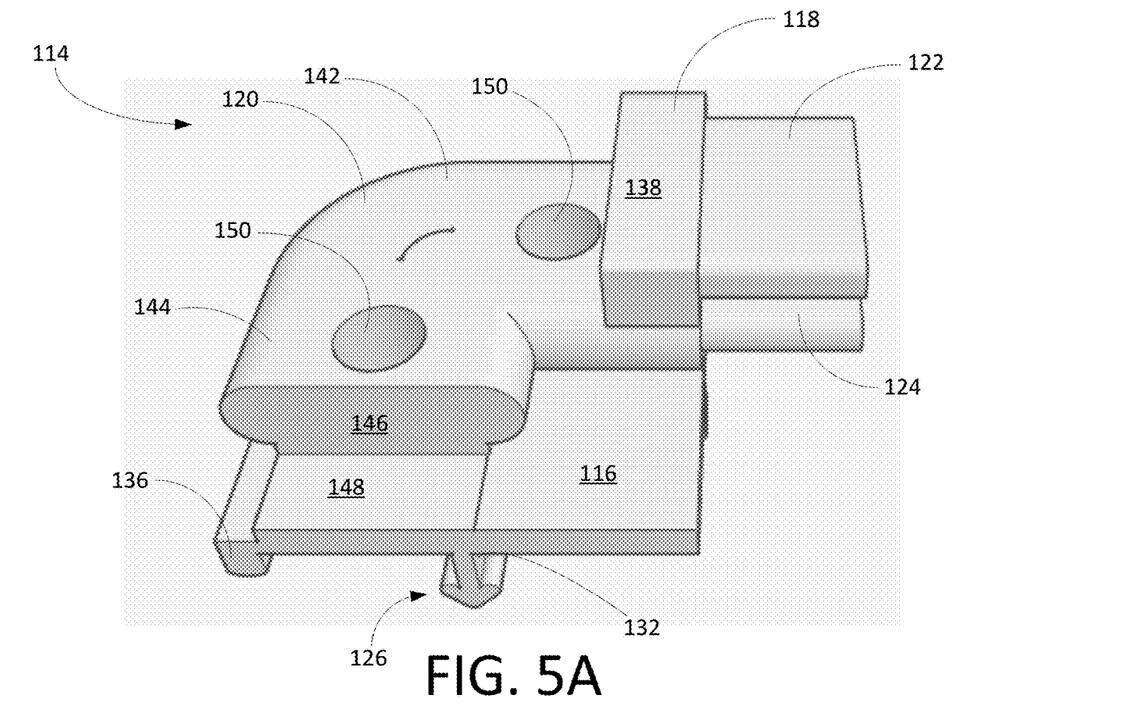
FIG. 5A is a top interior perspective view of the base of the gasket connector assembly of FIG. 2B.
Figure 5B:
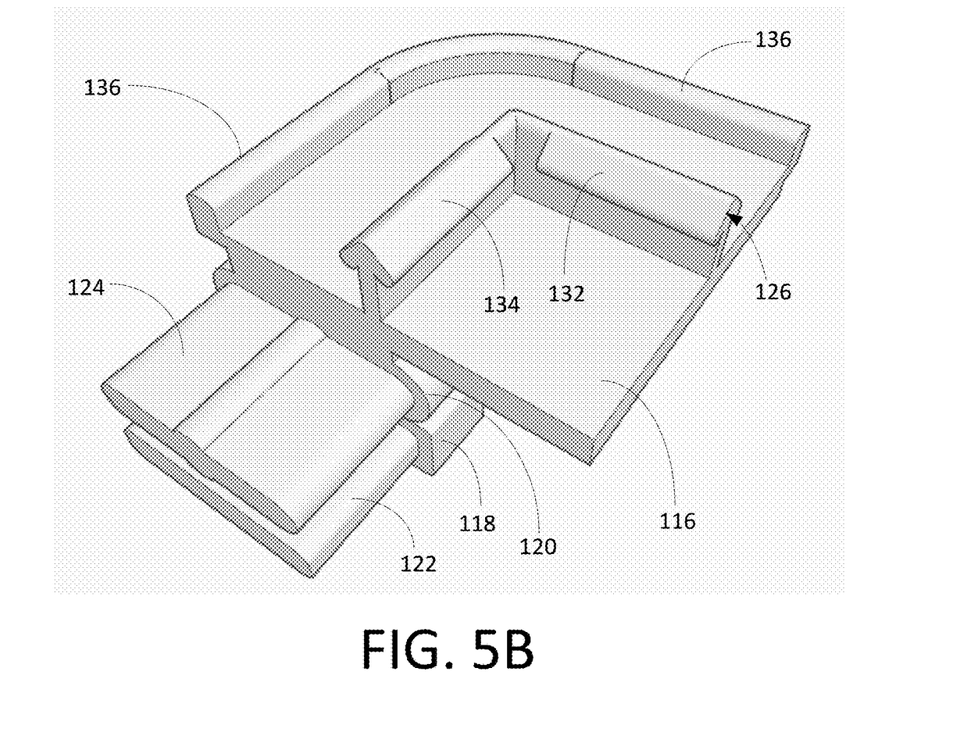
FIG. 5B is a bottom interior perspective view of the base of the gasket connector assembly of FIG. 2B.

The lower part 114 has a base portion 116, a cabinet engaging portion 118, and a bellows portion 120 that substantially correspond to the base portion 300, the cabinet engaging portion 302, and the bellows portion 304 of the gasket sections 102-108. The cabinet engaging portion 118 has an upper male connector member 122, and the bellows portion 120 has a lower male connector member 124. The upper and lower male connector members 122, 124 are configured to be received in the upper cavity 308 and the bellows cavity 306, respectively, of one section 102-108. The upper and lower male connector members 122 and 124 can be secured in the upper cavity 308 and the bellows cavity 306 with a suitable adhesive or by friction fit. The upper and lower male connector members 122, 124 have a reduced profile so the sections 102-108 are flush with the cabinet engaging portion 118 and the bellows portion 120 of the lower part 114 when the lower part 114 is secured to one section 102-108.

The base portion 116 of the lower part 114 is generally squared shaped and has a downwardly projecting winged dart 126 with a body 128 and two diverging arms 130. The body 128 and the diverging arms 130 align with the body and the diverging arms of the sections 102-108 so the body 128 and diverging arms 130 of the base portion 116 are received in the gasket retaining channel (not shown) of the refrigerator door. The downwardly projecting winged dart 126 has a first portion 132 and a second portion 134, with the first portion 132 oriented at an approximate right angle relative to the second portion 134. When the upper part 112 and the lower part 114 are connected to the sections 102-108, the inside flanges 528 of the one section (e.g., top section 102) and an adjacent section (e.g., side section 106) intersect one another. Thus, in one embodiment, the base portion 116 of the lower part 114 may have an outside flange 136 that corresponds to the outside flange 318 of the adjacent sections, and seals against the refrigerator door when the dart 126 is positioned in the gasket retaining channel.

The cabinet engaging portion 118 is generally block shaped with a planar top surface 138 and terminates with an end surface 140. The bellows portion 120 extends beyond the end surface 140 of the cabinet engaging portion 118 and is generally L-shaped with a first leg 142 and a second leg 144 oriented at approximately a right angle relative to the first leg 142. The second leg 144 of the bellows portion 120 terminates with an end surface 146 that is set back from the end of the base portion 116. A top side of the base portion 116 adjacent the end surface 146 has a recess 148.

A top side of the bellows portion 120 is provided with a pair of cavities 150. In one embodiment, one of the cavities 150 is formed in the first leg 142 and the other cavity 150 is formed in the second leg 144. The cavities 150 are shown to be cylindrical, but it will be appreciated that the cavities 150 may have a variety of shapes. Also, the number of cavities may be varied.

Figure 6A:
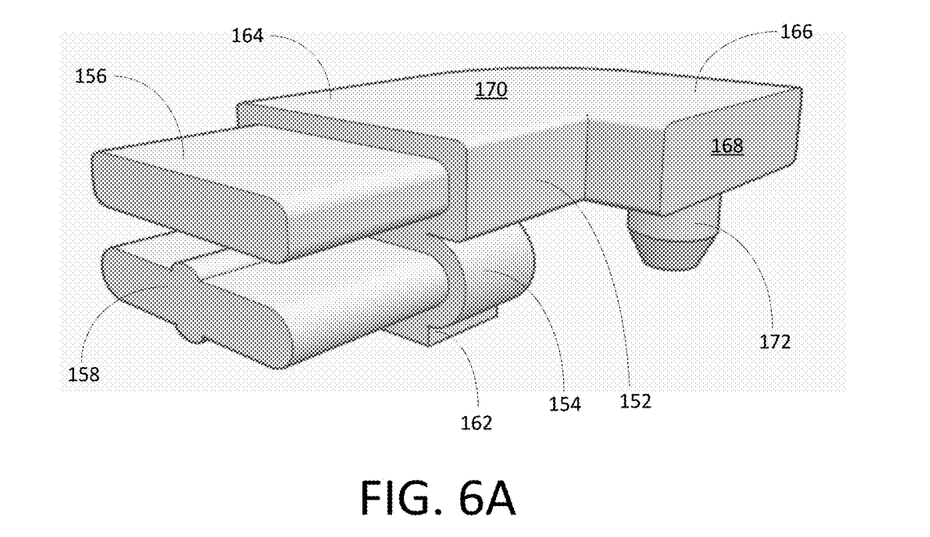
FIG. 6A is a top interior perspective view of the cap of the gasket connector assembly of FIG. 2B.
Figure 6B:
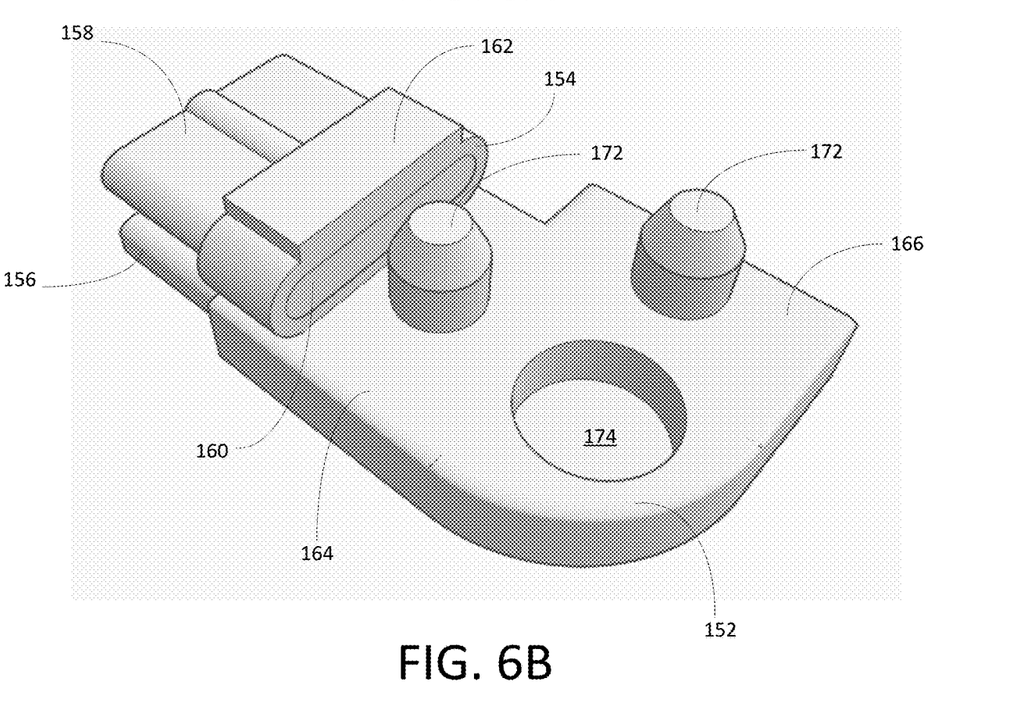
FIG. 6B is a bottom interior perspective view of the cap of the gasket connector assembly of FIG. 2B.
Figure 7A:
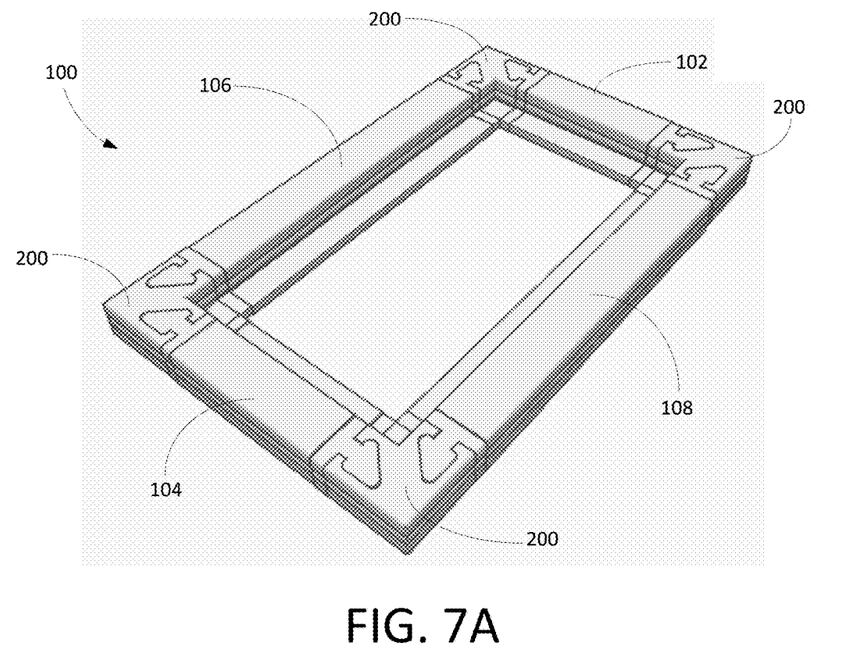
FIG. 7A is a perspective view of a gasket assembly constructed in accordance with a second embodiment (not drawn to scale).
Figure 7B:
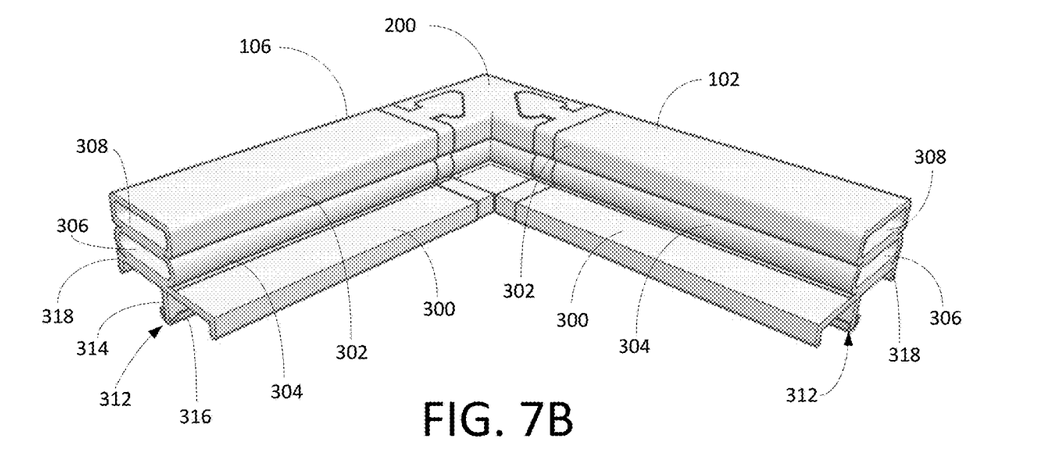
FIG. 7B is a close-up perspective view of a gasket connector assembly and adjacent gasket sections from the gasket assembly of FIG. 7A.
Figure 8A:
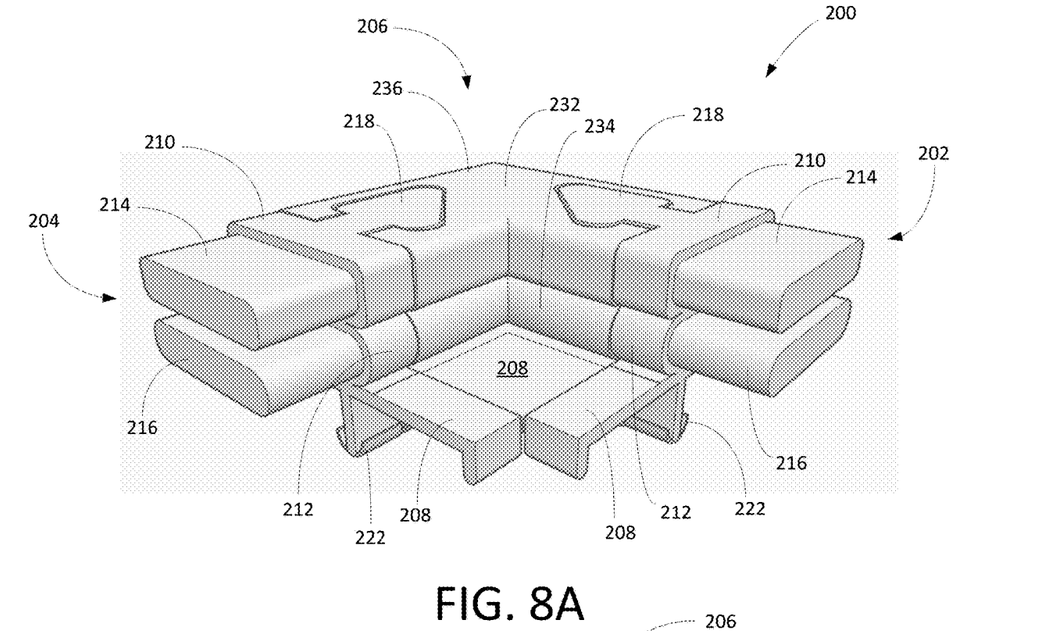
FIG. 8A is a top interior perspective view of the gasket connector assembly of FIG. 7A.
Figure 8B:
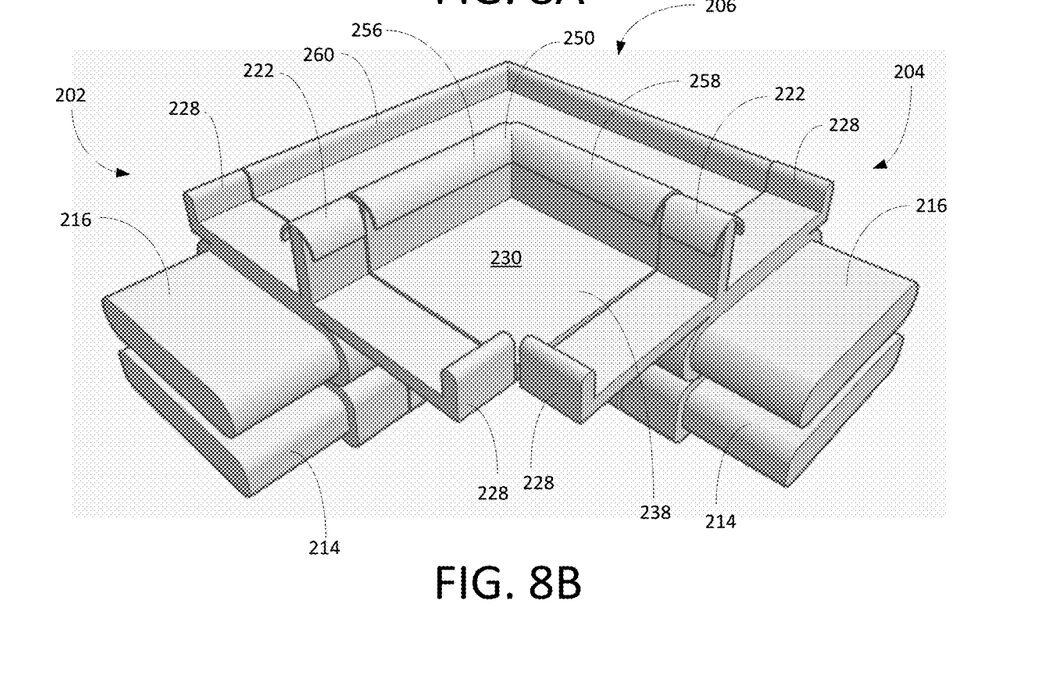
FIG. 8B is a bottom interior perspective view of the gasket connector assembly of FIG. 7A.

The upper part 112 has a cabinet engaging portion 152 and a bellows portion 154 that substantially correspond to the cabinet engaging portion 302 and the bellows portion 304 of the sections 102-108. The cabinet engaging portion 152 has an upper male connector member 156, and the bellows portion 154 has a lower male connector member 158. The male connector members 156, 158 are configured to be received in the upper cavity 308 and the bellows cavity 306, respectively, of one section 102-106. The upper and lower male connector members 156, 158 can be secured in the upper cavity 308 and the bellows cavity 306 with a suitable adhesive or by friction fit. The male connector members 156, 158 have a reduced profile so the sections 102-108 are flush with the cabinet engaging portion 152 and the bellows portion 154 of the upper part 112 when the upper part 112 is secured to one section 102-108.

The bellows portion 154 is generally block shaped and terminates with an end surface 160. The bellows portion 154 further has a protrusion 162 extending downwardly and shaped to matingly engage the recess 148 of the base portion 116 of the lower part 114. The cabinet engaging portion 152 extends beyond the end surface 160 of the bellows portion 154 and is generally L-shaped with a first leg 164 and a second leg 166 oriented at approximately a right angle relative to the first leg 164. The second leg 166 of the cabinet engaging portion 152 terminates with an end surface 168. A top side of the cabinet engaging portion 152 has a planar surface 170. A bottom side of the cabinet engaging portion 152 has a pair of downwardly projecting tabs 172 shaped to be matingly received in the cavities 150 of the lower part 114. The projecting tabs 172 may have tapered ends to facilitate insertion into the cavities 150. The projecting tabs 172 are sized to provide a friction or snap fit. The bottom side of the cabinet engaging portion 152 of the upper part 112 may further have a recess 174 for receiving a magnet 176 (not shown) to assist in sealing the gasket connector assembly 100 to the cabinet.

It should be appreciated that the projecting tabs 172 and the cavities 150 may be exchanged where the lower part 114 is provided with the projecting tabs 172 and the upper part 112 is provided with the cavities 150. The upper part 112 and the lower part 114 may be molded from a suitable polymeric material, such as polyethylene, a flexible PLA (polylactic acid), and a flexible TPU (thermoplastic polyurethane). In another version, the upper part 112 and the lower part 114 are produced through an additive manufacturing process, such as 3D printing.

Figure 3B:
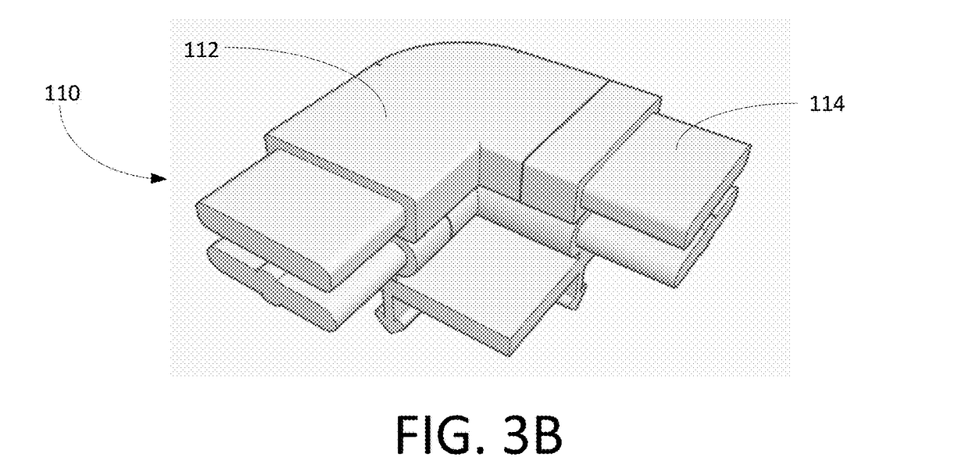
FIG. 3B is a top perspective view of the gasket connector assembly of FIG. 2B.
Figure 3C:
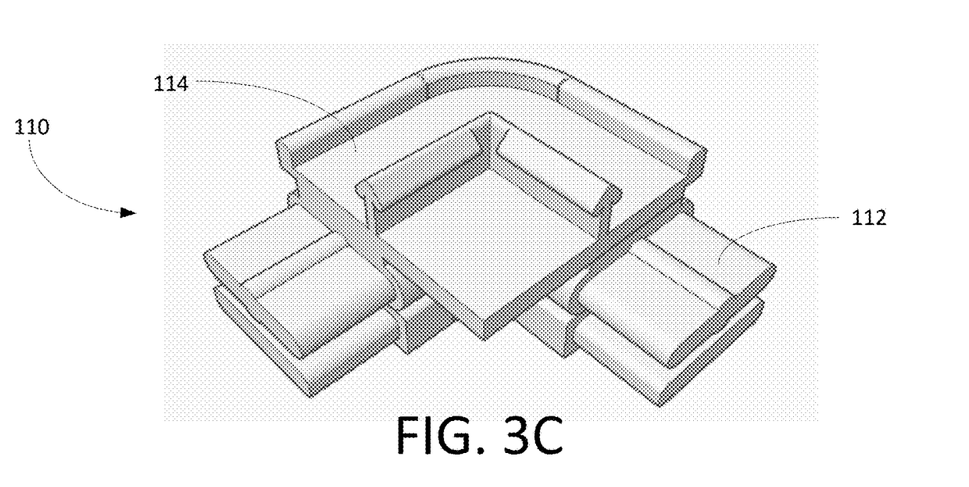
FIG. 3C is a bottom perspective view of the gasket connector assembly of FIG. 2B.
Figure 4A:
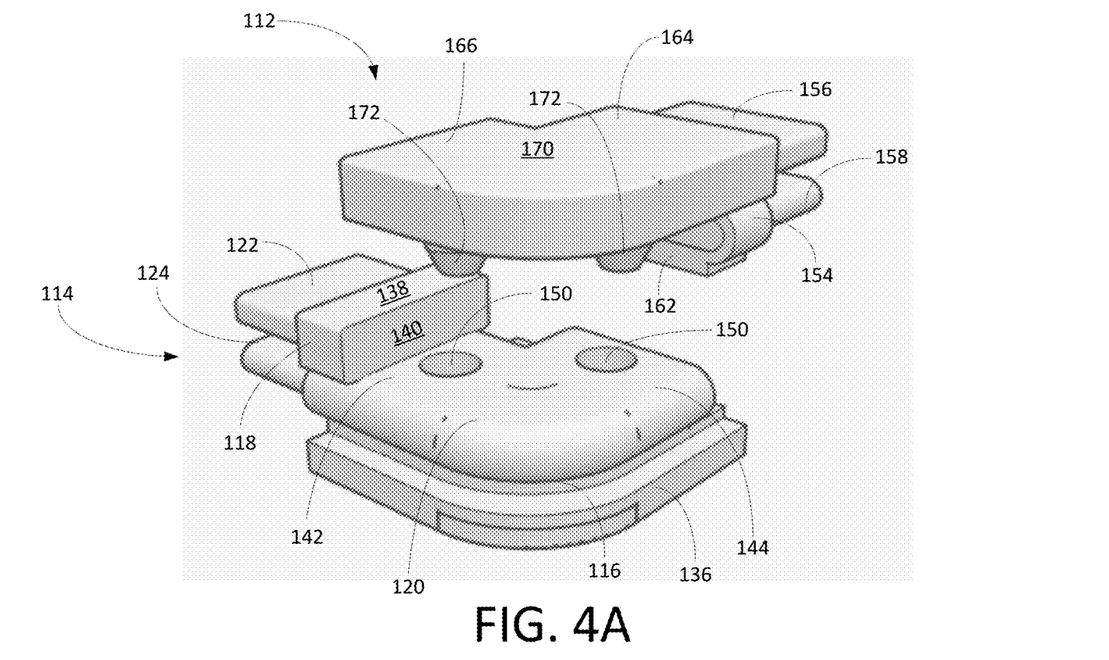
FIG. 4A is an exterior perspective exploded view of the gasket connector assembly of FIG. 2B.
Figure 4B:
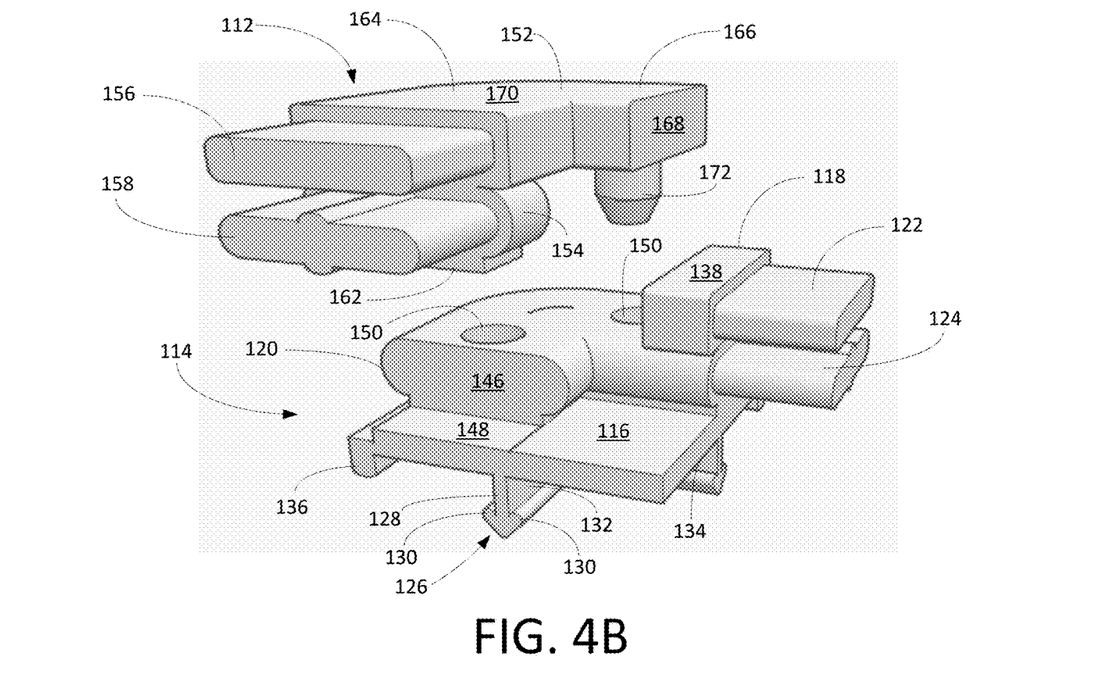
FIG. 4B is an interior perspective exploded view of the gasket connector assembly of FIG. 2B.

When the upper part 112 is connected to the lower part 114, the bellows portion 154 of the upper part 112 overlaps the base portion 116 of the lower part 114, with the protrusion 162 matingly received in the recess 148. The first leg 164 of the cabinet engaging portion 152 overlaps the second leg 144 of the bellows portion 120 of the lower part 114, and the second leg 166 of the cabinet engaging portion 152 overlaps the first leg 142 of the bellows portion 120 of the lower part 114, with the end surface 168 of the upper part 112 abutting the end surface 140 of the lower part 114, and the end surface 146 of the lower part 114 abutting the end surface 160 of the upper part 112. The projecting tabs 172 are matingly received in the cavities 150.

In use, the upper part 112 and the lower part 114 are secured to the ends of the sections 102-108. The lower part 114 can then be connected to the upper part 112 to form the gasket assembly 100. The gasket assembly 100 can be connected to the refrigerator door in a conventional manner by inserting the darts of the respective components into the gasket retaining channel of the refrigerator door. When a section of the gasket assembly 100 requires replacement, that section is removed by disconnecting the upper part 112 from the lower part 114 by lifting the upper part 112 away from the lower part 114. A new section 102-108 with a new upper part 112 on one end and a new lower part 114 on the opposite end can be connected to the refrigerator door by inserting the dart into the gasket retaining channel and mating the projecting tabs 172 of the upper part 112 with the cavities 150 of the lower part 114. In another embodiment, the upper part 112 and the lower part 114 can be removed from the old section and secured to a new section and then connected to the refrigerator door.

Turning to FIGS. 7A-10C, shown therein are various depictions of a second embodiment illustrating the use of a three piece coupler 200 connecting the top section 102, bottom section 104, side section 106 and side section 108. The three piece coupler 200 may be shaped to accommodate a variety of section profiles. The three piece coupler 200 has a first end section 202, a second end section 204, and a corner section 206. The first end section 202 is adapted to be connected to one end of a section, such as top section 102, and the second end section 204 is adapted to be connected to one end of an adjacent section, such as side section 106. The corner section 206 is adapted to connect the first end section 202 to the second end section 204. The first end section 202, the second end section 204, and the corner section 206 may be molded from a rigid polymeric material, such as polyethylene. The first end section 202 is a mirror image of the second end section 204, thus only the first end section 202 will be described in detail.

Figures 10A, 10B, 10C:
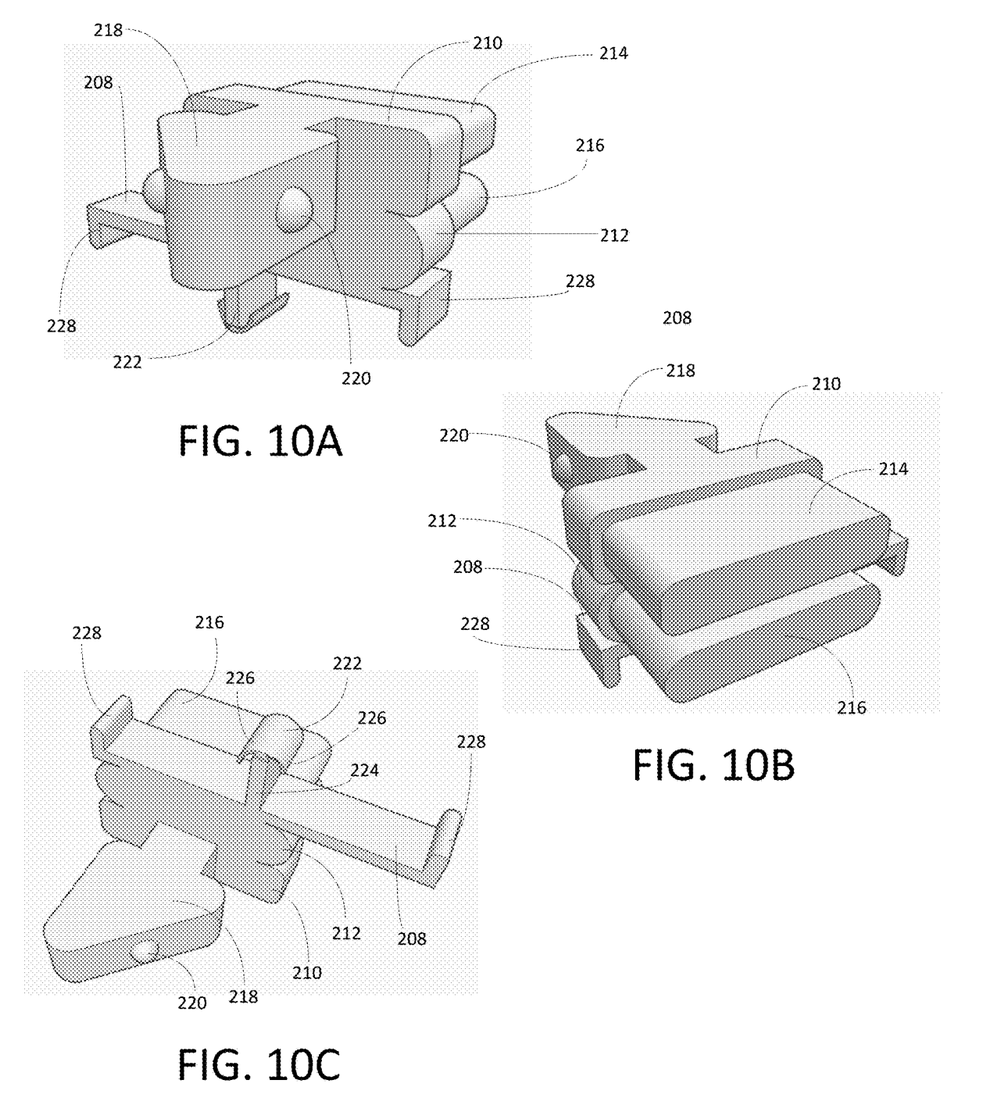
FIG. 10A is a front perspective view of an end tab from the gasket connector assembly of FIG. 7A.
FIG. 10B is a rear perspective view of an end tab from the gasket connector assembly of FIG. 7A.
FIG. 10C is a bottom perspective view of an end tab from the gasket connector assembly of FIG. 7A.

The first end section 202 has a base portion 208, a cabinet engaging portion 210, and a bellows portion 212 that substantially correspond to the base portion 300, the cabinet engaging portion 302, and the bellows portion 304 of the sections 102-108. Each of the cabinet engaging portion 210 and the bellows portion 212 has a male connector member 214 and 216, respectively, configured to be received in the upper cavity 308 and the bellows cavity 306, respectively, of one section 102-108. The male connector members 214 and 216 can be secured in the upper cavity 308 and the bellows cavity 306 with a suitable adhesive or by friction fit. The male connector members 214 and 216 have a reduced profile so the sections 102-106 are flush with the cabinet engaging portion 210 and the bellows portion 212 of the first end section 202 when the first end section 202 is secured to one section 102-108.

A tapered male connector member 218 extends in an opposite direction from the pair of male gasket connector members 214, 216. The tapered male connector member 218 matingly engages with the corner section 206 and is shown to have a generally triangular shape, but the male connector 218 can be formed in many shapes. The tapered male connector member 218 may be provided with a plurality of protrusions 220 to provide an interference or snap fit with the corner section 206.

The base portion 208 of the first end section 202 has a downwardly projecting winged dart 222 having a body 224 and two diverging arms 226. The body 224 and the diverging arms 226 align with the body 314 and the diverging arms 316 of the sections 102-108 so the body 224 and diverging arms 226 of the first end section 202 are received in the gasket retaining channel (not shown) of the refrigerator door. In one embodiment, the base portion 208 may have two flanges 228 that correspond to the flanges 318 of the sections 102-108 and that seal against the refrigerator door when the dart 222 is positioned in the gasket retaining channel.

Figure 9A:
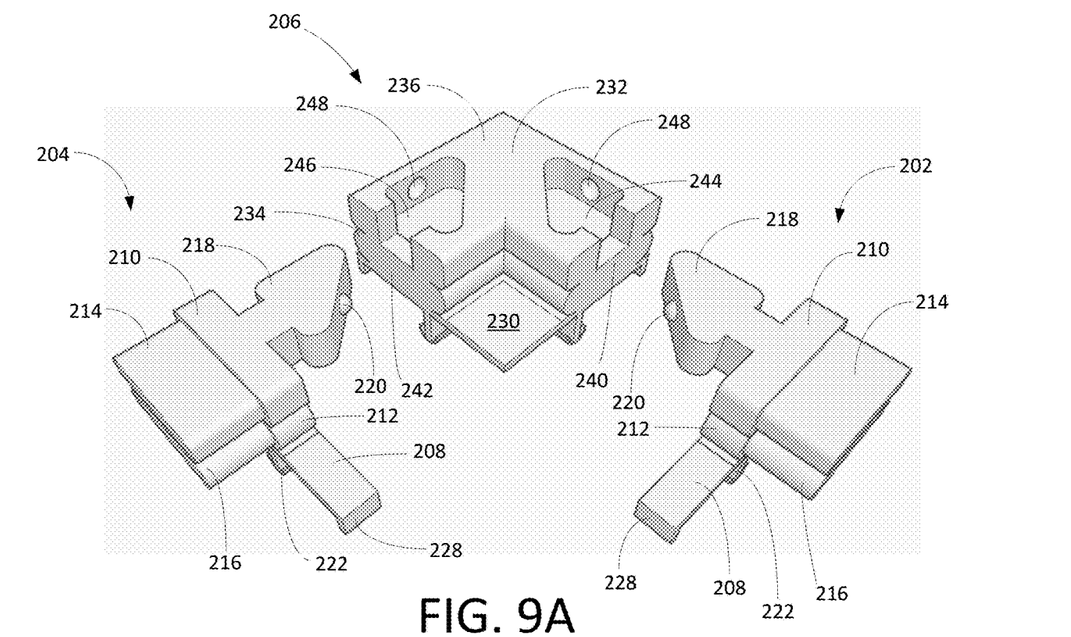
FIG. 9A is a top interior perspective and exploded view of the gasket connector assembly of FIG. 7A.
Figure 9B:
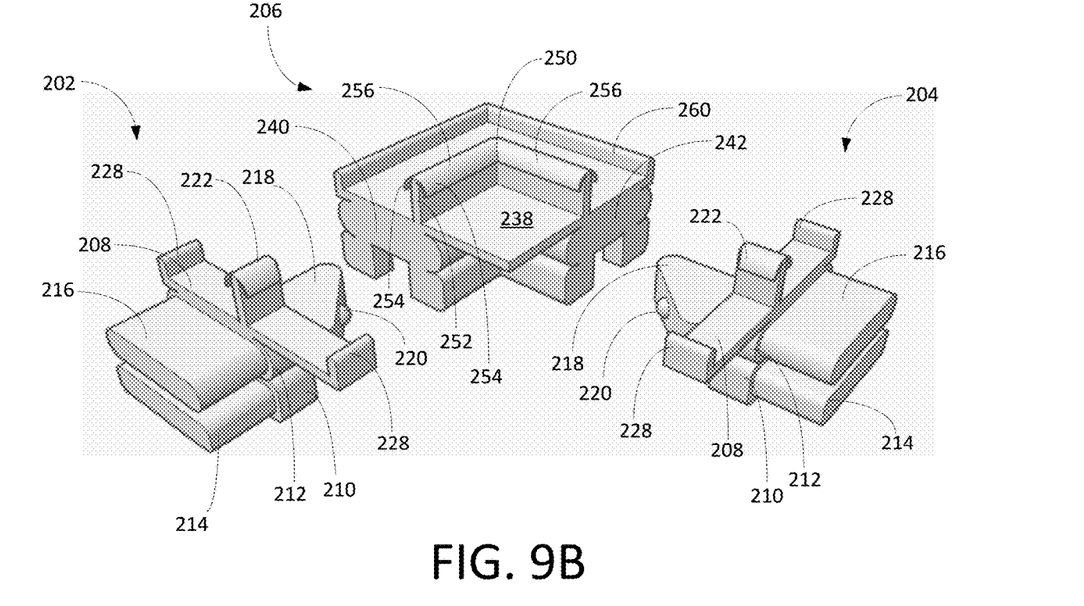
FIG. 9B is a bottom interior perspective and exploded view of the gasket connector assembly of FIG. 7A.

The first end section 202 and the second end section 204 are connected to the corner section 206 so the first end section 202 and the second end section 204 are oriented at approximately a right angle to one another. The corner section 206 has a base portion 230, a cabinet engaging portion 232, and a bellows portion 234 that substantially correspond to the base portion 208, the cabinet engaging portion 210, and the bellows portion 212 of the first end section 202 and the second end section 204. The corner section 206 has a top side 236, a bottom side 238 opposite the top side 236, a first end 240, and a second end 242 oriented 90 degrees relative to the first end 240. A first cavity 244 is open at the first end 240 and the top side 236, and a second cavity 246 is open at the second end 242 and the top side 236. The first cavity 244 is shaped to matingly receive the tapered male connector member 218 of the first end section 202 from the top side 236 of the corner section 206, and the second cavity 246 is shaped to matingly receive the tapered male connector member 218 of the second end section 204 from the top side 236 of the corner section 206. Each of the first cavity 244 and the second cavity 246 may be provided with recesses 248 for receiving the protrusions 220 of the tapered male connector 218.

The base portion 230 of the corner section 206 has a downwardly projecting winged dart 250 having a body 252 and two diverging arms 254. The body 252 and the diverging arms 254 align with the body 224 and the diverging arms 226 of the first end section 202 and the second end section 204 so the body 252 and diverging arms 254 of the corner section 206 are received in the gasket retaining channel (not shown) of the refrigerator door. The downwardly projecting winged dart 250 has a first portion 256 and a second portion 258 with the first portion 256 oriented at a 90 degree angle relative to the second portion 258. When the first end section 202 and the second end section 204 are connected to the corner section 206, the inside flanges 228 of the first end section 202 and the second end section 204 intersect one another. Thus, in one embodiment, the base portion 230 of the corner section 206 may have a single outside flange 260 that corresponds to the outside flange 228 of the first end section 202 and the second end section 204 and that seals against the refrigerator door when the winged dart 250 is positioned in the gasket retaining channel.

In use, the first end section 202 and the second end section 204 are secured to the ends of the sections 102-108. The corner sections 206 can then be connected to the first end sections 202 and the second end sections 204 to form a gasket assembly 100. The gasket assembly 100 can be connected to the refrigerator door in a conventional manner by inserting the darts of the respective components into the gasket retaining channel of the refrigerator door. When a section of the gasket assembly 100 requires replacement, that section is removed by disconnecting the first end section 202 and the second end section 204 from the respective corner sections 206 by lifting the first end section 202 and the second end section 204 away from the corner sections 206. A new section 102-108 with a new first end section 202 and a new second end section 204 can be connected to the refrigerator door by inserting the winged dart 222 into the gasket retaining channel and snapping the tapered male connectors 218 into the cavities 244, 246 of the corner sections 206. In another embodiment, the first end section 202 and the second end section 204 can be removed from the old section and secured to a new section and then connected to the refrigerator door.

From the above description, it is clear that the inventive concepts disclosed herein is well adapted to carry out the objects and to attain the advantages mentioned and those inherent in the inventive concepts disclosed herein. While preferred embodiments of the inventive concepts disclosed have been described for this disclosure, it will be understood that numerous changes may be made which will readily suggest themselves to those skilled in the art and which are It is claimed:

1. A gasket assembly for use in sealing a door to a cabinet of a refrigerator, wherein the door includes a gasket retaining channel, the gasket assembly comprising:
   a first section, wherein the first section includes a base portion connected to the door and a cabinet engaging portion for contacting the cabinet;
   a second section in a common plane with the first section, wherein the second section includes a base portion connected to the door and a cabinet engaging portion for contacting the cabinet;
   a third section in the common plane, wherein the third section includes a base portion connected to the door and a cabinet engaging portion for contacting the cabinet;
   a first two-piece coupler connecting the first section and the second section at an approximate right angle, wherein the first two-piece coupler comprises:
      a first part connected to the first section, wherein the first part comprises one or more projecting tabs;
      a second part connected to the second section, wherein the second part comprises one or more cavities each configured to receive a corresponding one of the one or more projecting tabs of the first part of the first two-piece coupler to releasably connect the first section to the second section; and
   a second two-piece coupler connecting the second section and the third section at an approximate right angle, wherein the second two-piece coupler comprises:
      a first part connected to the second section, wherein the first part comprises one or more projecting tabs; and
      a second part connected to the third section, wherein the second part comprises one or more cavities each configured to receive a corresponding one of the one or more projecting tabs of the first part of the second two-piece coupler to releasably connect the second section to the third section.

2. The gasket assembly of claim 1, wherein the second part of the first two-piece coupler comprises a winged dart that is configured to be captured within the gasket retaining channel on the door of the refrigerator.

3. The gasket assembly of claim 1, wherein the second part of the first two-piece coupler comprises one or more male connecting members that are captured within the second section.

4. The gasket assembly of claim 1, wherein the first part of the first two-piece coupler further comprises one or more male connecting members that are captured within the first section.

5. A gasket assembly for use in sealing a door to a cabinet of a refrigerator, wherein the door includes a gasket retaining channel, the gasket assembly comprising:
   a first section, wherein the first section includes a base portion attached to the gasket retaining channel and a cabinet engaging portion connected to the base portion;
   a second section in a common plane with first section, wherein the second section includes a base portion attached to the gasket retaining channel and a cabinet engaging portion connected to the base portion;
   a third section in the common plane, wherein the third section includes a base portion attached to the gasket retaining channel and a cabinet engaging portion connected to the base portion;
   a first two-piece coupler connecting the first section and the second section at approximately a right angle, wherein the first two-piece coupler comprises:
      an upper part connected to the first section, wherein the upper part includes a cabinet engaging portion and one or more projecting tabs; and
      a lower part connected to the second section, wherein the lower part comprises one or more cavities each configured to receive a corresponding one of the one or more projecting tabs from the upper part of the first two-piece coupler to permit the selective disconnection of the first section from the second section; and
   a second two-piece coupler connecting the second section and the third section at approximately a right angle, wherein the second two-piece coupler comprises:
      an upper part connected to the second section, wherein the upper part includes a cabinet engaging portion, wherein the upper part comprises one or more projecting tabs; and
      a lower part connected to the third section, wherein the lower part comprises one or more cavities each configured to receive a corresponding one of the one or more projecting tabs of the upper part of the second two-piece coupler to permit the selective disconnection of the second section from the third section.

* * * * *